United States Patent [19]

Morita

[11] Patent Number: 4,776,435
[45] Date of Patent: Oct. 11, 1988

[54] DISK BRAKE WITH PAIR OF GUIDE PINS AND WITH CENTER OF GRAVITY POSITIONED TO MINIMIZE UNEVEN BRAKE LINING WEAR

[75] Inventor: Takashi Morita, Tokyo, Japan

[73] Assignees: Akebono Brake Industry Co., Ltd., Tokyo; Akebono Research and Development Centre Ltd., Hanyu, both of Japan

[21] Appl. No.: 942,838

[22] Filed: Dec. 17, 1986

[30] Foreign Application Priority Data

Dec. 17, 1985 [JP] Japan .............................. 60-192983[U]

[51] Int. Cl.[4] ............................................. F16D 65/02
[52] U.S. Cl. ................................. 188/73.45; 188/71.1; 188/73.31
[58] Field of Search ................. 188/73.45, 73.44, 71.1, 188/73.31, 72.4, 205, 206, 73.47, 382, 73.35

[56] References Cited

U.S. PATENT DOCUMENTS

| | | | |
|---|---|---|---|
| 4,051,927 | 10/1977 | Karasundani | 188/73.3 |
| 4,106,595 | 8/1978 | Kimura et al. | 188/73.3 |
| 4,342,380 | 8/1982 | Melinat | 188/71.1 |
| 4,418,797 | 12/1983 | Fujimori | 188/73.45 X |

FOREIGN PATENT DOCUMENTS

| | | |
|---|---|---|
| 1079911 | 8/1967 | United Kingdom . |
| 1175789 | 12/1969 | United Kingdom . |
| 1220016 | 1/1971 | United Kingdom . |
| 1346860 | 2/1974 | United Kingdom . |
| 1563212 | 3/1980 | United Kingdom . |
| 2033989 | 5/1980 | United Kingdom . |
| 2058969 | 4/1981 | United Kingdom . |

OTHER PUBLICATIONS

"Lightweight Disc Brakes for Small Cars", *Automotive Engineering*, vol. 85, No. 5, May 1977, pp. 44–47.

Primary Examiner—Douglas C. Butler
Attorney, Agent, or Firm—Cushman, Darby & Cushman

[57] ABSTRACT

The center of gravity of the caliper element of a disk brake of the guide tin type is positioned so as to evenly distribute the braking forces on the friction pads during operation of the brake, the benefit being that the linings of such friction pads are prevented from becoming unevenly worn.

6 Claims, 2 Drawing Sheets

DISK BRAKE WITH PAIR OF GUIDE PINS AND WITH CENTER OF GRAVITY POSITIONED TO MINIMIZE UNEVEN BRAKE LINING WEAR

BACKGROUND OF THE INVENTION

The present invention relates to an automobile disk brake of the guide pin type.

An automobile disk brake of the guide pin type is shown in FIG. 3. In this disk brake, a pair of pins 18 and 19 are screw-engaged in tapped holes 20 and 21 to attach a caliper-shaped member 6 to a support 1 so that the caliper-shaped member can be optionally displaced relative to a support. The tapped holes 20 and 21 are provided in the support 1 at both ends thereof. The threaded shank portions 18a and 19a of the pins 18 and 19 are tightened in the tapped holes 20 and 21, respectively, to secure the pins to both the end portions of the support 1. Cylindrical guides 23 are provided to both ends of the caliper-shaped member 6, and are fitted by means of sleeves 22 on the pins 18 and 19, or directly fitted on the pins, to attach the caliper-shaped member to the support 1 so that the caliper-shaped member can be optionally displaced relative to the support.

However, since the pin 18 and the sleeve 22, which support the caliper-shaped member 6 to make it optionally displaceable relative to the support 1, and the cylindrical guides 23, which are provided in the caliper-shaped member, are slidably fitted with each other, it is inevitable that very small gaps will develop between the outside circumferential surface of the sleeve 22 and the inside circumferential surface of the cylindrical guide 23 and between the outside circumferential surface of the pin 18 and the inside circumferential surface of the other cylindrical guide 23. Because of the presence of those gaps, the axes of the pins 18 and 19 and those of the cylindrical guides 23 become skewed with respect to one another if the contact portions 29 of the caliper-shaped member 6 and a backing element of a friction pad are offset to each other along the axial directions of the cylindrical guides 23 or if the center of gravity of the caliper-shaped member 6 is not located between planes perpendicular to the pins 18 and 19 and extending on the ends of the pins. In that case, the cylindrical guides 23 of the caliper-shaped member 6 deviate relative to the pins 18 and 19 parallel with the axis of gyration of a rotor 9, so that the cylindrical guides 23 become skewed with respect to the axis of gyration of the rotor. As a result, the directions of forces which push a pair of friction shoes 10 on the inside and outside 9a and 9b of the rotor 9 become unparallel with respect to the axis of gyration of the rotor. For that reason, the directions of the forces which push the linings of the friction pads 10 on the inside and outside 9a and 9b of the rotor 9 become unperpendicular to the inside and outside of the rotor, so that the forces which act on the radially inner and outer portions of the linings of the pads 10 become uneven. As a result, the linings are not uniformly worn. When the linings are nonuniformly worn, a noise is made in braking or the braking power of the disk brake diminishes.

SUMMARY OF THE INVENTION

In the present invention, forces which push friction pads on the inside and outside of a rotor are uniformly applied to the friction pads in the braking operation of the disk brake. For that reason, the linings of the friction pads are prevented from being unevenly worn in the radial and circumferential directions, which would make unwanted noise, reduce the braking power of the disk brake and shorten the life of each of the linings.

BRIEF DESCRIPTION OF THE DRAWINGS

FIG. 1 shows a plan view of the disk brake.

FIG. 2 shows a view of the disk brake seen leftwards as to FIG. 1.

DETAILED DESCRIPTION OF THE PREFERRED EMBODIMENT OF THE INVENTION

Figure 1:
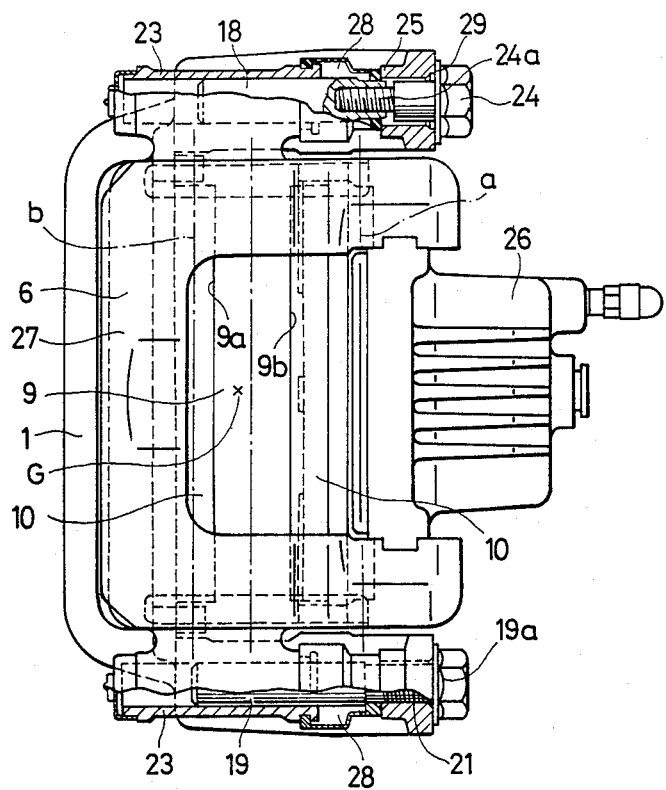
FIGS. 1 and 2 show an embodiment of the present invention, which is a disk brake.
Figure 2:
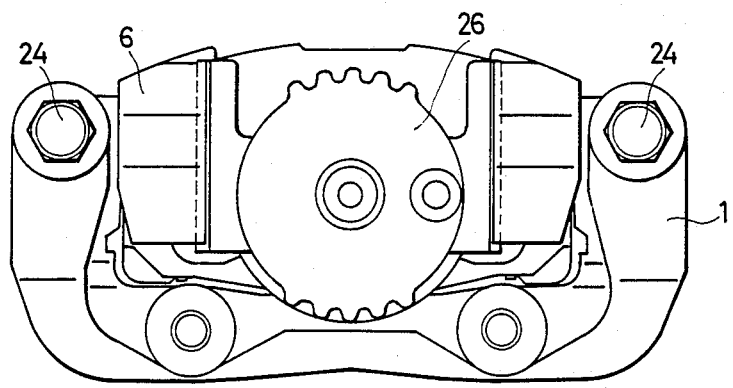
Figure 3:
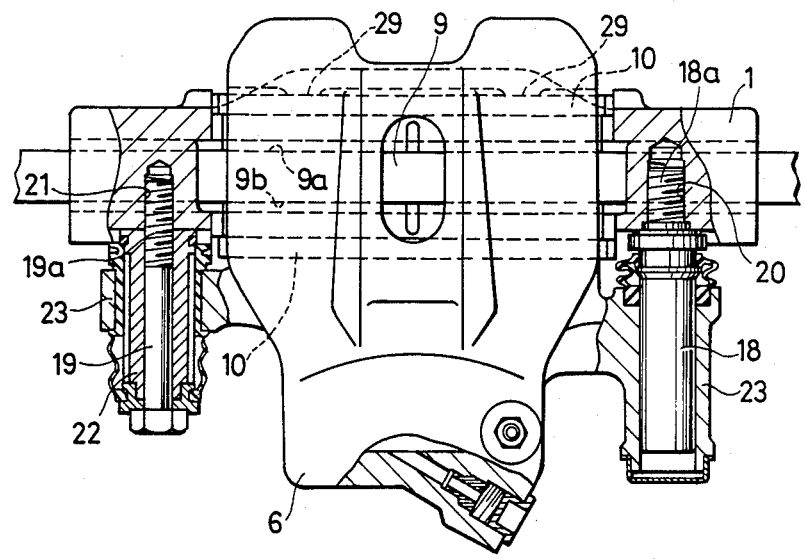
FIG. 3 shows a front view of a conventional disk brake.

In the disk brake, a caliper-shaped member 6 is attached by a pair of movement guide pins 18 and 19 to a support 1 that is secured to the body of a vehicle at the inside of a rotor 9, which rotates together with the wheel of the vehicle, in the same manner as the above-described conventional disk brake of the guide pin type. A pair of friction pads 10 facing the inner side and outer side 9a and 9b of the rotor 9 are put in pressure contact with the rotor through the action of the caliper-shaped member 6 to brake the wheel through the medium of the rotor 9.

A bolt 24 is inserted into a hole 29 provided in the support 1 at one end thereof inside the inside 9a of the rotor 9. The threaded portion 24a of the bolt 24 is tightened in the tapped hole 25 of the butt portion of the pin 18 to secure the pin to the support 1. The threaded portion 19a of the pin 19 is tightened in the tapped hole 21 of the support 1 at the other end thereof to secure the pin 19 to the support. The tip portions (left-hand portions as to FIGS. 1) of the pins 18 and 19 are located outside the outside 9a of the rotor 9 so that the pins penetrate an imaginary surface extending outside around the rotor 9.

Cylindrical guides 23 which are provided in the caliper-shaped member 6 are fitted on the pins 18 and 19. The center G of gravity of the caliper-shaped member 6 is always located between a first vertical plane which contains a straight line (a) extending between the innermost ends of the pins 18 and 19 and which is perpendicular to the plane of FIG. 1, and a second vertical plane which contains another straight line (b) that extends between the outermost ends of the pins 18 and 19 and is perpendicular to the plane of FIG. 1, regardless of whether the disk brake is in braking operation or not and of how much the linings of the pads 10 are worn. The cylinder 26 (and piston if necessary) of the caliper-shaped member 6, in which the piston is fitted, is designed and made of an aluminum alloy, a synthetic resin or the like which is lighter than the cast iron or other heavier metal of which the yoke 27 of the caliper-shaped member 6 is made, so that the center G of gravity of the caliper-shaped member is located almost in the central part of the member. Such a design can be effected through known techniques, including spatial integration of numerical analysis.

The pin 18 is secured to the support 1 by a bolt 24 so as to make it unnecessary to remove a dust-proofing boot 28 from between the pin 18 and the cylindrical portion 23 when the bolt 24 is removed which is necessary to turn the caliper-shaped member 6 about the pin 19 in order to replace the pads 10 with new ones.

The braking operation of the disk brake of the guide pin type is the same as that of the above-described conventional disk brake of the guide pin type. Since the center G of gravity of the caliper-shaped member 6 is attached in an optionally displaceable manner to the support 1 by the pins 18 and 19, and the cylindrical guides 23 are located as described above, the axes of the pins 18 and 19 and those of the cylindrical guides 23 do not become skewed with respect to one another, and the resultant force applied to the friction pads 10 in the braking operation stays perpendicular to the inner side and outer side 9a and 9b of the rotor 9.

While the invention has been described in connection to what is presently considered to be the most practical and preferred embodiment, it is to be understood that the invention is not limited to the disclosed embodiment, but on the contrary is intended to cover various modifications and equivalent arrangements included within the spirit and scope of the appended claims.

What is claimed is:

1. A disk brake of the guide pin type for attachment to the body of a vehicle and for engagement with a rotatable rotor which has inner and outer surfaces comprising:

a support element which is adapted to be mounted to the body of said vehicle at one side of the rotor;

a caliper element movable relative to said support element, whereby said rotatable rotor may be disposed between said support element and said caliper element, said caliper element including a pair of cylindrical guide members and a cylinder provided at said one side of the rotor;

a pair of movement guide pins having innermost ends secured to said support element of said one side of the rotor and outermost ends which are received in said guide members, with axes which are positioned substantially parallel with the axis of rotation of said rotor, said pins being disposed outside the periphery of said rotor;

wherein the center of gravity of said caliper element is located between a first plane that contains a straight line which extends between the innermost ends of said movement guide pins and which is perpendicular to the axes of said guide member which is perpendicular to the axes of said guide pins, and a second plane that contains a straight line which extends between the outermost end of said movement guide pins and which is perpendicular to the axes of said guide pins.

2. The disk brake according to claim 1, wherein the caliper element comprises a cylinder that is made of a lightweight material and a yoke that is made from a heavier material.

3. The disk brake according to claim 2, wherein said lightweight material is an aluminum alloy or a synthetic resin, and said heavier material is cast iron or metal plate.

4. A disc brake of the guide pin type for attachment to the body of a vehicle to brake a wheel of the vehicle, comprising:

a rotor adapted to rotate with the wheel;

a support member adapted to be secured to the body of the vehicle at one side of said rotor;

a caliper member for supporting a pair of friction pads which are adapted to press against said rotor, said caliper member having a cylinder provided at said one side of said rotor;

cylindrical guide members provided on said caliper member and disposed so as to extend outside and over an outer periphery of said rotor; and a pair of guide pins secured to said support member at said one side of said rotor, said guide pins extending substantial parallel to the axis outside said outer periphery of said rotor and being slidably fitted, respectively, within said cylindrical guide members whereby the caliper remains centered during braking, ensuring even wear on the friction pads wherein the center of gravity of said caliper member is located between a first plane that contains a straight line which extends between the innermost ends of said guide pins and which is perpendicular to the axes of said guide member which is perpendicular to the axes of said guide pins, and a second plane that contains a straight line which extends between the outermost ends of said guide pins and which is perpendicular to the axes of said guide pins.

5. The disk brake of claim 4, wherein the center of gravity of said caliper member is located between a pair of planes each containing a respective straight line extending, respectively, between each of first and second ends of said respective guide pins.

6. The disk brake of claim 5, wherein said cylinder of said caliper member is made of an aluminum alloy, and said cylinder further comprises a yoke made of cast iron.

* * * * *